(12) United States Patent  (10) Patent No.: US 12,609,815 B2
Wright et al.  (45) Date of Patent: Apr. 21, 2026

(54) COMPUTER IMPLEMENTED METHOD AND SYSTEM FOR ENCRYPTING DATA

(71) Applicant: nChain Licensing AG, Zug (CH)

(72) Inventors: Craig Steven Wright, London (GB); Brock Gilles Doiron, London (GB)

(73) Assignee: NCHAIN LICENSING AG, Zug (CH)

( * ) Notice: Subject to any disclaimer, the term of this patent is extended or adjusted under 35 U.S.C. 154(b) by 1150 days.

(21) Appl. No.: 17/604,391

(22) PCT Filed: Apr. 3, 2020

(86) PCT No.: PCT/IB2020/053218
§ 371 (c)(1),
(2) Date: Oct. 15, 2021

(87) PCT Pub. No.: WO2020/212796
PCT Pub. Date: Oct. 22, 2020

(65) Prior Publication Data
US 2025/0286705 A1     Sep. 11, 2025

(30) Foreign Application Priority Data

Apr. 16, 2019   (GB) ..................................... 1905348

(51) Int. Cl.
*H04L 29/06*          (2006.01)
*H04L 9/00*           (2022.01)
(Continued)

(52) U.S. Cl.
CPC .......... *H04L 9/0838* (2013.01); *H04L 9/0863* (2013.01); *H04L 9/14* (2013.01); *H04L 9/50* (2022.05)

(58) Field of Classification Search
CPC ....... H04L 9/0838; H04L 9/50; H04L 9/0863; H04L 9/14
See application file for complete search history.

(56) References Cited

U.S. PATENT DOCUMENTS 10,050,779 B2    8/2018    Alness et al.
10,129,223 B1    11/2018   Bhattacharyya et al.
(Continued)

FOREIGN PATENT DOCUMENTS

JP      2005229178 A    8/2005
WO      2016209939 A1   12/2016
(Continued)

OTHER PUBLICATIONS

Antonopoulos, "Mastering Bitcoin—Unlocking Digital Cryptocurrencies," O'Reilly Media, Inc., Dec. 20, 2014, 282 pages.
Cryptorekt, "Encrypted Messaging," https://github.com/tokenpay/tokenpay/blob/master/doc/Encrypted%20Messaging.md, Jun. 22, 2018, 4 pages.
(Continued)

*Primary Examiner* — Evans Desrosiers
(74) *Attorney, Agent, or Firm* — Tarolli, Sundheim, Covell & Tummino LLP

(57)  ABSTRACT

A method of encrypting data is disclosed. The method comprises determining, at a first node associated with a first public-private key pair of a cryptography system having a first private key ($V_A$) and a first public key ($P_A$), a common secret ($S_1$) common with the first node and a second node, wherein the second node is associated with a second public-private key pair of the cryptography system having a second private key ($V_B$) and a second public key ($P_B$). The common secret is determined on the basis of the first private key and the second public key, and the properties of the cryptography system are such that the common secret can be determined on the basis of the second private key and the first public key. An encryption key, based on the common secret, is determined for encryption of data (M), and the data is encrypted on the basis of the encryption key, wherein the step of encrypting data includes an exclusive or (XOR) operation.

19 Claims, 4 Drawing Sheets

(51) Int. Cl.
  *H04L 9/08* (2006.01)
  *H04L 9/14* (2006.01)

(56) References Cited

U.S. PATENT DOCUMENTS

| | | | |
|---|---|---|---|
| 2010/0027783 A1 | 2/2010 | Yup | |
| 2019/0050541 A1* | 2/2019 | Wright | G06Q 20/3827 |
| 2022/0209937 A1* | 6/2022 | Ragan | H04L 9/083 |

FOREIGN PATENT DOCUMENTS

| | | | |
|---|---|---|---|
| WO | 2017145021 A1 | 8/2017 | |
| WO | 2018235845 A1 | 12/2018 | |
| WO | WO-2019038634 A1 * | 2/2019 | H04L 9/3066 |

OTHER PUBLICATIONS

International Search Report and Written Opinion mailed May 15, 2020, Patent Application No. PCT/IB2020/053218, 13 pages.

Nakamoto, "Bitcoin: A Peer-to-Peer Electronic Cash System," Bitcoin, Oct. 31, 2008, https://bitcoin.org/bitcoin.pdf, 9 pages.

Sastry et al., "A Modified Feistel Cipher Involving Modular Arithmetic Addition and Modular Arithmetic Inverse of a Key Matrix," International Journal of Advanced Computer Science and Applications, 2012, 4 pages.

Satoshi et al., "Connection Limits," Bitcoin Forum, Aug. 9, 2010, https://bitcointalk.org/index.php?topic=741.0; prev_next=prev, 2 pages.

UK IPO Search Report mailed Dec. 19, 2019, Patent Application No. GB1905348.7, 4 pages.

Cryptrec.com, "2009 List Guide", Funding Report Related to Cryptography Technology, Mar. 2010, 29 pages.

* cited by examiner

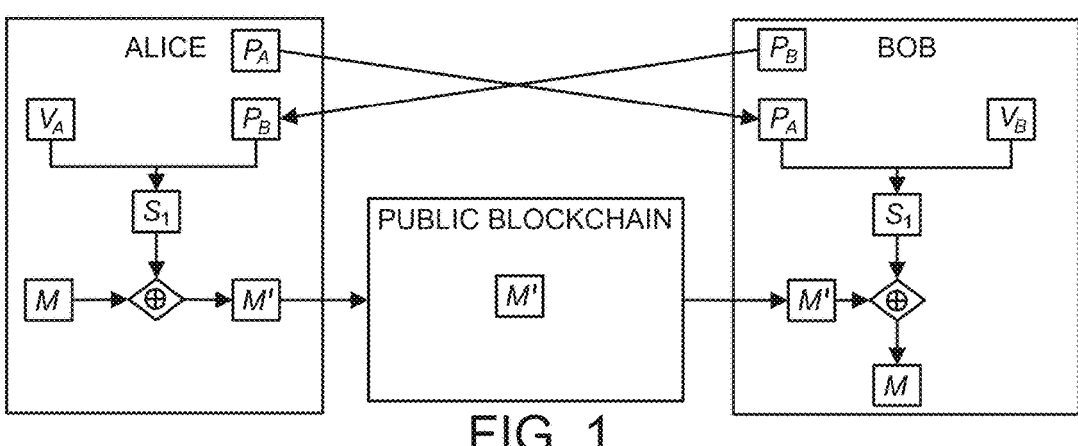

FIG. 1

| Stack | Script |
|---|---|
| | $(Sig\ P_B)(P_B)(S_1)$ OP_DUP OP_HASH($h(S_1)$) OP_EQUALVERIFY $(h(P_B)\oplus S_1)$OP_XOR OP_SWAP OP_DUP OP_HASH OP_ROT OP_EQUALVERIFY OP_CHECKSIG |
| $(h(S_1))$ $(S_1)$ $(P_B)$ $(Sig\ P_B)$ | $(h(S_1))$ OP_EQUALVERIFY $(h(P_B)\oplus S_1)$ OP_XOP OP_SWAP OP_DUP OP_HASH OP_ROT OP_EQUALVERIFY OP_CHECKSIG |
| $(S_1)$ $(P_B)$ $(Sig\ P_B)$ | $(h(P_B)\oplus S_1)$ OP_XOR OP_SWAP OP_DUP OP_HASH OP_ROT OP_EQUALVERIFY OP_CHECKSIG |
| $(h(P_B)\oplus S_1)$ $(S_1)$ $(P_B)$ $(Sig\ P_B)$ | OP_XOR OP_SWAP OP_DUP OP_HASH OP_ROT OP_EQUALVERIFY OP_CHECKSIG |
| $(h(P_B))$ $(P_B)$ $(Sig\ P_B)$ | OP_SWAP OP_DUP OP_HASH OP_ROT OP_EQUALVERIFY OP_CHECKSIG |
| $(P_B)$ $(h(P_B))$ $(Sig\ P_B)$ | OP_DUP OP_HASH OP_ROT OP_EQUALVERIFY OP_CHECKSIG |
| $(P_B)$ $(P_B)$ $(h(P_B))$ $(Sig\ P_B)$ | OP_HASH OP_ROT OP_EQUALVERIFY OP_CHECKSIG |
| $(h(P_B))$ $(P_B)$ $(h(P_B))$ $(Sig\ P_B)$ | OP_ROT OP_EQUALVERIFY OP_CHECKSIG |
| $(h(P_B))$ $(h(P_B))$ $(P_B)$ $(Sig\ P_B)$ | OP_EQUALVERIFY OP_CHECKSIG |
| $(P_B)$ $(Sig\ P_B)$ | OP_CHECKSIG |
| True | |

FIG. 2

Encryption
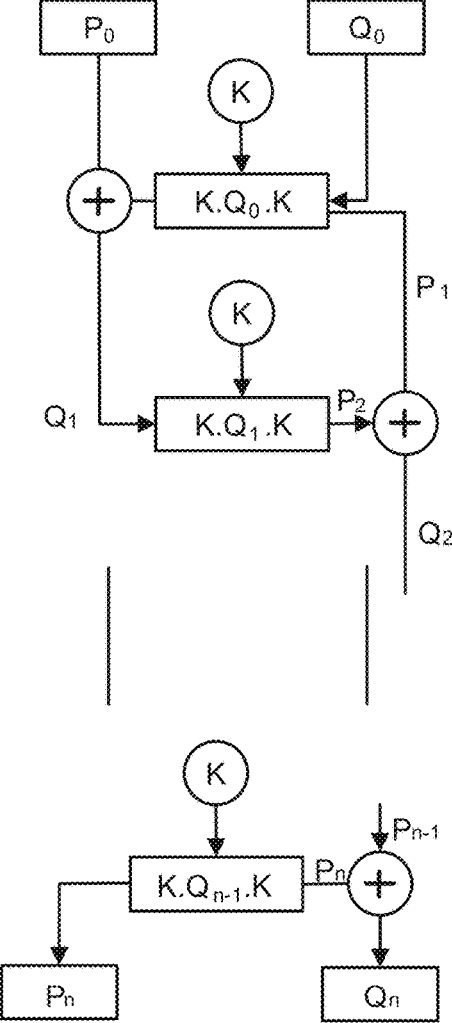
Decryption
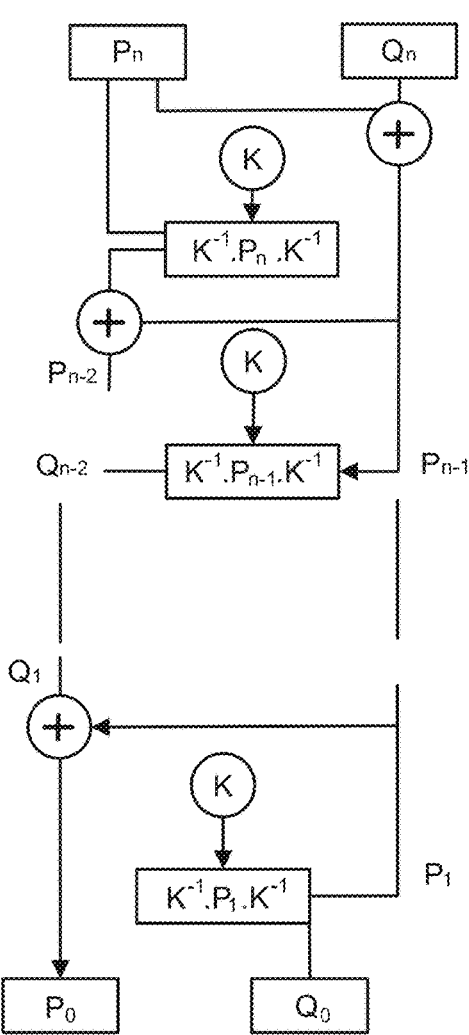
FIG. 3

COMPUTER IMPLEMENTED METHOD AND SYSTEM FOR ENCRYPTING DATA

CROSS-REFERENCE TO RELATED APPLICATION

This application is a 371 National Stage Patent Application of International Patent Application No. PCT/IB2020/053218, filed on Apr. 3, 2020, which claims priority to United Kingdom Patent Application No. 1905348.7, filed Apr. 16, 2019, the disclosures of which are incorporated herein by reference in their entirety.

TECHNICAL FIELD

The present disclosure relates to a computer implemented method and system for encrypting data, and relates particularly, but not exclusively, to such a method for use on the blockchain. The disclosure also relates to a method of applying authentication data to a message.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction-if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

In systems where communication between parties occurs on an insecure network, a significant concern is the establishment of shared private keys. Secure key distribution protocols have been developed to address this problem including Diffie-Helman (DH) symmetric key exchange [Merkle, Ralph C. (April 1978). "Secure Communications Over Insecure Channels". Communications of the ACM. 21 (4): 294-299, and Diffie, Whitfield; Hellman, Martin E. (November 1976). "New Directions in Cryptography" IEEE Transactions on Information Theory. 22 (6): 644-654] and the three-pass protocol [Menezes, A.; van Oorschot, P.; Vanstone, S. (1996). "Handbook of Applied Cryptography". CRC Press. p. 500]. Although these methods achieve secure encryption, it is computationally expensive to generate and share large key sets or continuously generate keys.

International patent application WO 2017/145016 discloses a method to establish a series of shared secret keys using only public keys, a deterministic key and properties of elliptic curve algebra. Never having to transmit the shared secret key over the public network, it is impervious to a man-in-the-middle attack. From this shared secret key, it is almost trivial to derive any number of additional shared private keys through elliptic curve arithmetic or key generation extensions as proposed in this work. It should be noted that this protocol is agnostic to key length as keys can be concatenated or truncated to reach a desired length.

It is desirable to provide more computationally efficient extensions of the protocol disclosed in International patent application WO 2017/145016 but which maintains the same level of security.

SUMMARY

Thus, in accordance with the present disclosure there is provided a method as defined in the appended claims.

There may be provided a method of encrypting data, the method comprising:

determining, by a first participant, an encryption key, based on a common secret common with said first participant and a second participant, for encryption of data;

encrypting said data on the basis of said encryption key to provide encrypted data, wherein the step of encrypting said data includes at least one exclusive or (XOR) operation; and incorporating said encrypted data into a blockchain transaction.

There may be provided a method for generating an encryption key for encrypting data, the method comprising:

determining, by a first participant, an encryption key for encryption of data, wherein the encryption key is based on at least one exclusive or (XOR) combination of first data, based on a common secret common with said first participant and a second participant, with second data, based on application of a one way function to data based on the common secret.

There may be provided a method of applying authentication data to a message, the method comprising:

determining, by a first participant, message authentication data for a message to be communicated to a second participant, wherein the message authentication data is determined by applying a function, known to said first participant and said second participant, to said message and to a common secret common to said first participant and said second participant.

There may be provided a system, comprising:

a processor; and memory including executable instructions that, as a result of execution by the processor, causes the system to perform any embodiment of the computer-implemented method described herein.

There may be provided a non-transitory computer-readable storage medium having stored thereon executable instructions that, as a result of being executed by a processor of a computer system, cause the computer system to at least perform an embodiment of the computer-implemented method described herein.

BRIEF DESCRIPTION OF THE DRAWINGS

Various embodiments in accordance with the present disclosure will be described with reference to the drawings, in which:

FIG. 1 is a schematic diagram of an encryption and decryption protocol;

FIG. 2 shows processing of a blockchain script for redemption of a blockchain transaction;

FIG. 3 shows a block data encryption and decryption scheme;

DESCRIPTION OF EMBODIMENTS

XOR-Based Encryption Scheme

Figure 4:
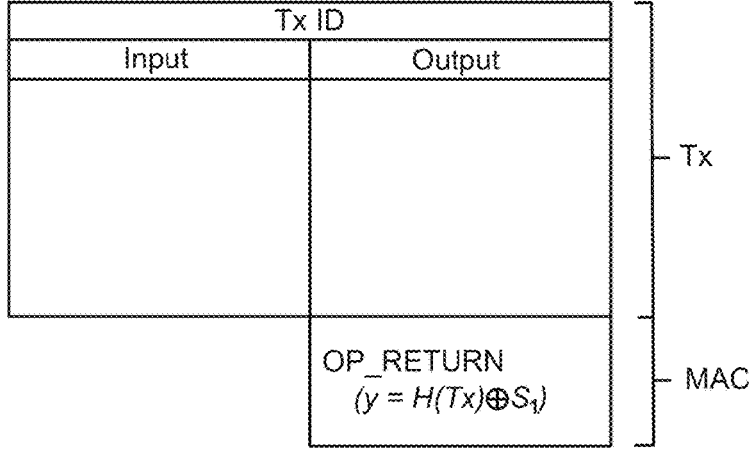
FIG. 4 shows a blockchain transaction incorporating message authentication data.

The XOR operation, denoted by the symbol $\oplus$, is an operation between two binary bits that returns 1 if and only if one of the input bits is equal to 1. Otherwise, the operation returns a value of 0. This can be summarised by the following truth table:

| a | b | a$\oplus$b |
|---|---|---|
| 0 | 0 | 0 |
| 0 | 1 | 1 |
| 1 | 0 | 1 |
| 1 | 1 | 0 |

Given a message M and secret key S, the derived cyphertext of the message is given by M'=M$\oplus$S. For example, for a message M=011110 and secret key S=101010, the encrypted message is calculated using bit-by-bit XOR operations:

| M | 011110 |
|---|---|
| S | $\oplus$101010 |
| M' | 110100 |

The decryption process exploits the associative nature of the XOR operation and the property that A$\oplus$A=0 to retrieve the original message. That is, M'$\oplus$S=(M$\oplus$S)$\oplus$S=M$\oplus$(S$\oplus$S)=M. Thus, to retrieve the original message (M) one only requires calculation of the bit-by-bit XOR of the shared secret key(S) with the cyphertext message (M'):

| M' | 110100 |
|---|---|
| S | $\oplus$101010 |
| M | 011110 |

Provided that the secret key and message is not known by any intercepting party, this provides a perfectly secure one-time-pad (OTP) method of communication, provided each secret key is used only once. One risk of transferring cyphertext over public networks is the malleability of binary strings in the case of an attack of an intercepting party. However, this can be circumventing by exploiting the immutability of public blockchains as shown below.

Securely Establishing a Shared Private Key

As established in International patent application WO 2017/145016, a shared private key can be derived between two parties, say Alice (A) and Bob (B), using their public keys, a pre-agreed elliptic curve (for example scep256k1) and generator point, G. Starting with their respective private keys ($V_A$ and $V_B$ for Alice and Bob, respectively). They each begin by calculating their public keys using the elliptic curve operations:

$$P_A = V_A \cdot G$$

$$P_B = V_B \cdot G$$

and proceed to exchange their public keys. Alice calculates the shared private key ($S_{AB}$) using her private key ($V_A$) and Bob's public key ($P_B$):

$$S_{AB} = V_A \cdot P_B$$

Bob calculates the shared private key ($S_{AB}$) using his private key ($V_B$) and Alice's public key ($P_A$):

$$S_{AB} = V_B \cdot P_A$$

Using the associative and commutative properties of elliptic curve point addition, the two calculated values are known to be identical:

$$V_A \cdot P_B = V_A \cdot (V_B \cdot G) = (V_A \cdot V_B) \cdot G = (V_B \cdot V_A) \cdot G = V_B \cdot (V_A \cdot G) = V_B \cdot P_A$$

As the result of the calculation of the shared private key is a point on the elliptic curve ($x_{AB}$, $y_{AB}$), they can agree, for example, to take $S_1 = x_{AB}$. This has the same hierarchy and the same set of processes as the arrangement described in International patent application WO 2017/145016, but in place of using the generated secret as a symmetric key, it is used as a one-time pad (OTP) in the XOR-based sense. As in International patent application WO 2017/145016, each process in this work can be extended to incorporate a deterministic key using a similar hierarchical key generation scheme.

FIG. 1 shows a key generation and XOR message encryption protocol embodying the present disclosure for communicating between two parties over an insecure public network. Following the exchange of public keys $P_A$ and $P_B$ between Alice and Bob, they each use elliptic curve multiplication to calculate the shared private key $S_1$. Alice encrypts a message, M, using the secret key $S_1$ and includes the resulting cyphertext M' in a transaction on the blockchain 2. Bob reads the cyphertext M' and decrypts it using the shared secret key. Solid boxes in FIG. 1 denote private parameters and dashed boxes denote publicly shared information.

Non-Malleable XOR Cryptosystems Using the Blockchain

The immutability of public blockchains can solve the malleability issue of transferring binary cyphertext over insecure networks. The cyphertext can be included inside a Bitcoin transaction that is sent to the network and recorded immutably on the blockchain. If the cyphertext is included in the output of a transaction, which is signed by the sender and validated by a mining node, then it will only be recorded on the blockchain if it has not been altered after signing. Similarly, someone reading the cyphertext from the blockchain can be sure of the integrity of the transaction data by checking that the hash of the transaction is equal to the transaction ID. This ensures end-to-end immutability of the cyphertext. Moreover, as signatures are unique to a public key, the sender's identity can also be verified.

It should be noted that if the data is included in the input script, the authenticity cannot be guaranteed as this part of the transaction is not signed by the sender.

There are two options to insert the cyphertext in an output of the transaction:

1. Unspendable Output (OP_RETURN)

If the data is included in OP_RETURN, it cannot be used in a future locking script but is useful as a store of the cyphertext. For example, if the address of a receiver, Bob, is included in a transaction, Bob's wallet can scan the blockchain for references to his address (for example using a smart wallet such as the one used in the Tokenization protocol [William H, Brian P, Flannery P, Saul A, et al. Numerical recipes in C: The Art of Scientific Computing (1992) Cambridge]) and locate the cyphertext. Bob can then calculate the shared private key ($S_1$) with the protocol established above and then retrieve the original message locally using $M=M' \oplus S_1$. This protocol is shown schematically in FIG. 1. Using this method, the transmission of data is resilient to man-in-the-middle attacks.

It should be noted that as this process only requires XOR calculations, this can easily be performed on low processing power devices.

As a use case, suppose a service provider Alice (A) wishes to send a user Bob (B) a single-use session key. This session key can be included as a message addressed to Bob and be used to verify log-in credentials, initiate a communication channel, or used in any other application requiring identity verification replacing conventional user name and password-based systems.

The process proceeds as follows in terms of two parties establishing a single-use session key K. To be able to reuse the shared secret key, it should not be used directly in obscuring messages. By using the hash of the shared key $(H(S_1))$ for encrypting the session key, a single exposed session key will not reveal the secret key.

1) A computes $S_1 = x_{AB}$.
2) A computes $K \oplus h(S_1) = S_{K_x}$
3) A creates a transaction to B and includes $S_{K_x}$ in the script as public text.

4) B receives the Tx, on receipt B does not need to spend the tx to see $S_{k_x}$.
5) B computes $S_1 = x_{AB}$.
6) B computes $K = S_{k_x} \oplus h(S_1)$.
7) B now has a session key that is private and can be used on other systems for authentication or access (such as for a control and proof token).

Alice can then require solution a hash puzzle solution h(K) in order to allow access to her system. As there is no risk of $S_1$ being exposed in this, it is safe to keep reusing the same shared secret.

2. Spendable Output

A similar method to the above could be used using OP_DROP instead of OP_RETURN to insert the cyphertext as a spendable output. However, in Bitcoin Script, the opcode OP_XOR allows spending conditions to be imposed by decrypting the cyphertext, opening up interesting for masking data until after spending. For example, the XOR operation can be used to obscure inputs or exchange OTP keys that Alice and Bob can use to create more private and secure scripts. Without any interaction with Bob, Alice can use this secret value ($S_1$) to hide payments to him while they remain unspent.

To do this, Alice uses a locking script of the form:

OP_DUP OP_HASH ⟨(h($S_1$)⟩OP_EQUALVERIFY
⟨h($P_B$)⊕$S_1$⟩OP_XOR OP_SWAP
OP_DUP OP_HASH OP_ROT OP_EQUALVERIFY
  OP_CHECKSIG

This is solved by the input:

⟨Sig $P_B$⟩⟨$P_B$⟩⟨$S_1$⟩

The first line of the locking script is a hash puzzle that ensures the correct shared secret is used. The second line uses the secret to decrypt ⟨h($P_B$)⟩. Then the third line checks the signature as in a standard transaction. The evaluation of the redemption process is shown in detail in FIG. 2.

It should be noted that when the above transaction is spent, the shared secret is exposed. This can be circumvented by replacing $S_1$ with $S'=h(S_1)$ in the script above, which Bob and Alice can both calculate.

As an example, Alice can create a transaction redeemable by Bob or a third party, Charlie. The redemption condition for Charlie can be included in the locking script in an identical way using the shared key between Alice and Charlie. Using the properties of the hash function and the XOR operation described above, the identities of Bob and Charlie can be completely hidden until the transaction is redeemed. When it is redeemed, only the identity of the one who redeems the transaction is exposed.

This may be useful if two (or more) parties are anonymously competing to be the first to satisfy a condition or awaiting a condition where one party can redeem (this can include the outcome of a sporting or other event). If there are multiple parties, Bob and Charlie as an example, Alice can set a transaction to be redeemable by Bob or Charlie in the same script without the other knowing. That is, Alice constructs a locking script using a conditional OP_OR, redeemable by either Bob or Charlie. This is a scenario where Bob and Charlie can calculate the XOR value of their own public key hash value for redemption, but the other cannot.

Multi-Party Communication

The versatility of the XOR scheme allows for easy extension of communication networks to include many members, each with a secure means of communicating between them. Using the key distribution protocol or the master-key derivation approach described above, a decentralised communication network is straightforward to establish using XOR encryption and one-time pads. The XOR-based encryption allows for secure and rapid decryption even on low processing power devices. For a centralised system, where a service provider verifies identities and gives access to selected parties, additional concerns must be addressed.

For example, take a company or organization consisting of a manager Alice (A), who may wish to provide encrypted communication between employees while still keeping a record of these communications. Take, for example, Alice is messaging Bob (B) and Bob is messaging Charlie (C), (A→B, B→C). Alice may wish to keep record of all transactions to have a full record of the events on their network. Alice and Bob can communicate using their shared key $(S_{AB1})$. When Bob messages Charlie, they use their shared key, $(S_{BC1})$ but this message is also relayed to Alice using a derived private key $(S_{AB2})$.

$$M_1' = (M_1 \oplus S_{AB1})$$
$$\left[ M_2' = (M_2 \oplus S_{AB2}) \right.$$
$$M_2'' = (M_2 \oplus S_{BC1})$$

This then links Alice to all other parties going forward to ensure that she is always informed of the actions on the network. This allows private communication between users that are not mutually-trusting while not being completely hidden from the service providers.

Key Derivation Schemes

Using the initial shared secret key derived from the process described above, additional keys can be generated securely and efficiently without the need to establish a new set of private keys. By exploiting the infeasibility of inverting the hash function, the one-time pad (OTP) limitation of the XOR encryption scheme can be relaxed without compromising security. This can be extended to a very large number of keys to be able to securely encrypt large data formations such as multimedia files, which will be described below.

Using a single elliptic curve calculation as above, the two parties establish a private key $S_1 = x_{AB}$. A series of keys can be derived from this message to encode a predetermined number of messages, say n. The key set can be derived as $S_{i+1} = S_1 \oplus h(S_i)$, yielding:

$$S_1 = x_{AB}$$
$$S_2 = S_1 \oplus h(S_1)$$
$$S_3 = S_1 \oplus h(S_2) = S_1 \oplus h(S_1 \oplus h(S_1))$$
$$\vdots$$
$$S_n = S_1 \oplus h(S_{n-1})$$

This set of keys is generated using only the initial shared secret and only a single initial elliptic curve point calculation. These keys can then be used to encode the n messages, starting with $S_n$. That is, $$M_1' = M_1 \oplus S_{n+1}$$
$$\vdots$$
$$M_2' = M_2 \oplus S_n$$
$$M_n' = M_n \oplus S_2$$

The initial shared secret is never used on its own to encrypt a message, as such a single compromised message will not destroy the security of all the encrypted messages. Furthermore, the use of hash functions in the key calculations prevents reversal of the calculation. Thus, by using in the keys in reverse order $(S_{n+1} \rightarrow S_2)$, finding out $S_{n+1}$ would not compromise $S_n$. As it is not feasible to determine $S_1$ and $S_i$, even given the message $M_{(n-i+1)}$, the keys can even be safely reused.

Large Data Encryption Using Block Cyphers

To efficiently encrypt large sets of data, such as multimedia files, data can be divided into fixed-length blocks and identical operations are performed on each block. It has been shown previously that additional security can be provided to block cypher schemes by exploiting the properties of matrix multiplication [Sastry, V. U. K.; Anup Kumar, K. (2012) "A Modified Feistel Cypher Involving XOR Operation and Modular Arithmetic Inverse of a Key Matrix". International Journal of Advanced Computer Science and Applications (IJACSA). 3 (7): 35-39]. In the referenced work, a large string is encoded by adding each character's ASCII value into a matrix and multiplying the matrix with a randomly generated key matrix in a Feistel cypher (where typically repeated permutations and XOR operations are used to encode a single string). In the present application, it is shown how a deterministic key matrix can be derived to extend this process using XOR operations to securely and efficiently encode large data sets.

In the present document, the process derived in [Sastry, V. U. K.; Anup Kumar, K. (2012) "A Modified Feistel Cypher Involving XOR Operation and Modular Arithmetic Inverse of a Key Matrix". International Journal of Advanced Computer Science and Applications (IJACSA). 3 (7): 35-39] is outlined. A large data set is divided into 8-bit chunks, known as words, and padded to ensure the data fits into precisely $2m^2$ words. These words are then inserted as entries in a $2m \times m$ matrix P. A prime modulus, N, is chosen to provide sufficient security for the desired application. To encrypt the data stored in P, a randomly generated key matrix K of size $m \times m$ is constructed. Following this, the data matrix P is divided into two $m \times m$ matrices $P = (P_0, Q_0)$. The algorithms to encrypt and decrypt the data matrices are presented below. The encryption (and corresponding decryption) algorithm is iterated n times, providing an additional security parameter. As each iteration permutes the data, the data becomes more scrambled with increasing iterations. This structure is used in Data Encryption Standard or DES (n=16) and Advanced Encryption Standard or AES (n=10-14).

Exploiting the nonlinearity of the encryption process assures that even if multiple text-cyphertext pairs are exposed the keys cannot be determined using the Gaussian elimination algorithm. Therefore, a single key matrix K can be used to encrypt multiple data files. Additionally, the similarity of the encryption and decryption processes reduces the length of code and subsequently the amount of hardware required for the computation.

Encryption

Input: $P=(P_0, Q_0)$, n, K, and N

1. For i=1 to n:

Do $$P_i = (K \cdot Q_{i-1} \cdot K) \bmod N$$

$$Q_i = P_{i-1} \oplus P_i$$

End

2. Return $C=(P_n, Q_n)$

Decryption

Input: $C=(P_n, Q_n)$, n, K, and N

1. Calculate $K^{-1}$ using Gauss-Jordan Elimination [8]

2. For i=1 to n:

Do $$Q_{i-1} = \left(K^{-1} \cdot P_i \cdot K^{-1}\right) \bmod N$$

$$P_{i-1} = Q_i \oplus P_i$$

End

3. Return $P=(P_0, Q_0)$

Construction of the Feistel Cypher Key Matrix

A modified Feistel encryption scheme is now proposed using only the key $S_1$ as generated using the process outlined above and is shown in detail in FIG. 3. The key matrix K is constructed by taking repeated hashes of the secret $S_1$, followed by bitwise XOR with $S_1$. Using the key generation protocol described above, $m(m+1)$ unique keys are first derived from $S_1$ as set out above:

1) $S_1 \oplus h(S_1) \rightarrow S_2$

2) $S_1 \oplus h^2(S_1) \rightarrow S_3$ $\vdots$ i) $S_1 \oplus h^i(S_1) \rightarrow S_i$ $\vdots$ $m(m+1)+1)S_1 \oplus h^{m(m+1)}(S_1) \rightarrow S_{m(m+1)+1}$ The elements are used to construct two matrices with linearly independent columns and rows (and therefore invertible).

$$K_1 = \begin{bmatrix} S_2 & 0 & \cdots & 0 \\ S_3 & S_4 & & 0 \\ \vdots & & \ddots & \vdots \\ S_{\frac{m(m-1)}{2}+1} & S_{\frac{m(m-1)}{2}+2} & \cdots & S_{\frac{m(m+1)}{2}+1} \end{bmatrix}$$

$$K_2 = \begin{bmatrix} S_{\frac{m(m+1)}{2}+1} & S_{\frac{m(m+1)}{3}+1} & \cdots & S_{\frac{m(m+3)}{2}+1} \\ 0 & S_{\frac{m(m+3)}{2}+2} & & S_{\frac{m(m+1)}{2}+1} \\ \vdots & & \ddots & \vdots \\ 0 & 0 & \cdots & S_{m(m+1)+1} \end{bmatrix}$$

K is then defined to be $K=K_1K_2$, which assures that K is also invertible (necessary for the decryption process).

Secure Multimedia Transfer

With a more efficient method to encrypt large data sets, it is possible to encrypt multimedia files to securely be sent across public networks, such as via internet and mobile phone service provider, with end-to-end encryption. Both matrix multiplication and Gauss-Jordan Elimination matrix inversion can be performed with computational complexity of $O(m^{2.376})$ using the Coppersmith-Winograd algorithm. This allows for sub-second encryption and decryption even on most modern mobile devices. The pre-division of data into uniform-sized blocks facilitates the inclusion of large files within the blockchain as a single stream or divided amongst multiple transactions. Using the messaging protocol from the previous section, this can be easily integrated into peer-to-peer communication.

Large Data Encryption Using Streaming Encryption

An alternative to block cypher protocols is streaming encryption schemes, where keys are continuously generated, and data is rapidly encoded one bit at a time. Using the securely generated private keys $S_1$ and a derived key $S_2$, a stream cypher seed can be generated using the concatenation (conc( )) operation starting with:

$$\text{Seed} = \text{SHA}_{256}(\text{conc}(S_1, S_2))$$

Using the seed as the input to a standard PRNG (pseudo random number generator) and using the XOR operation to encode the data, a stream cypher can be shared as a fast encryption and decryption system. Such a protocol is imperative for secure streaming of media files or audio/video calls between two parties. The specifics of the protocol are discussed with respect to the hash-based message authentication code (HMAC) described in detail below.

Message Authentication Code (MAC)

Using the key distribution protocol, a Message Authentication Code (MAC) can be created. A MAC allows the receiver of a message to verify the identity of the sender as well as assuring the message has not been tampered with. The MAC is generated using a publicly known function of a shared secret key that is known jointly by Alice (A) and Bob (B) along with the message being sent.

Blockchain-Based Message Authentication Code

Alice and Bob can establish the shared key $(S_1)$ using the protocol introduced above. That is:

$$S_A \cdot S_B \cdot G = P_A S_B$$

$$= P_B S_A$$

$$= (x_{AB}, y_{AB})$$

$$S_1 = (x_{AB})$$

Using a known public function $f$ (such as one including the XOR operation), the MAC is calculated in terms of a shared key $(S_1$ or some derived key from $S_1)$ and the message M. Alice computes the value $y=f(M, S_1)$ and sends the pair (M, y) to Bob. Within the context of blockchains, this information can be incorporated in a transaction from Alice to Bob in OP_RETURN or as metadata in a transaction. Bob can then take the information in the transaction from Alice and he can recompute y to check its validity. If the message has not originated from Alice or the message has been changed, the function $f$ will produce a different value of y and can be ignored.

As an example, by defining the message, M, to be all transaction data before OP_RETURN, this provides a method to verify offline that transaction data has not been altered during transmission without need of miner validation. This is shown schematically in FIG. 4, which shows a message authentication code (MAC) using blockchain transaction data. By incorporating the transaction data within the MAC, it can be used as a transaction verification scheme to provide additional security without need to be connected to a network. This is critical for very low power mobile devices.

Figure 5:
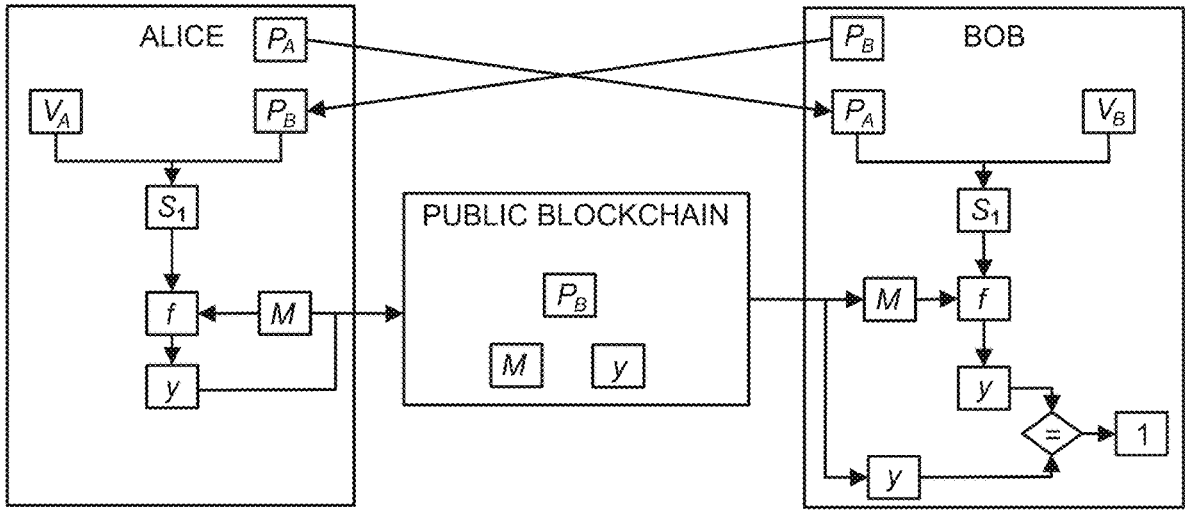
FIG. 5 shows a message authentication code protocol.

FIG. 5 shows a message authentication code (MAC) protocol embodying the present disclosure for communication between two parties using a public blockchain. Following the establishment of a shared secret key (as shown in FIG. 1), Alice computes the MAC (y) using an agreed upon function, $f$ using the message, M. Alice includes the message and MAC in a transaction to Bob. Bob computes the MAC himself using the secret key and compares it to the MAC read from the blockchain. If they are equal, Bob can be sure of the integrity of the message the identity of the sender.

This verification approach can be performed offline between two parties where Bob can use the information M and shared secret $S_1$ from Alice to receive a value offline and later accept the value y as an authentication. This is, after key $S_1$ is computed then Alice sends a transaction tx with the message (M) included as metadata. Alice sends Bob a message pair (y, M) offline to authenticate to a remote system, which sees the transaction on a blockchain.

The process is as follows:
1) A sends transaction (including M) to B
2) A sends y to B either directly or included within the transaction.
3) Host calculates $y=f(M,S_1)$ using the shared secret $S_1$. If message changes, $y'=f(M', S_1)$ will be different.

The MAC can also be used as a CRC (Cyclic Redundancy Check) to detect random errors in encoding or transmission. By validating that the same MAC can be reproduced following transmission, one can be sure that the correct message is retrieved. This can also be used as an offline method to authenticate to a remote system.

Confidentiality

The MAC can be encrypted to add confidentiality to the transaction and authentication (hiding the value y and M when sent to the server, for example). The second generated key can be used to encrypt the MAC and provide the additional privacy. This can be extended by taking the hash to generate a second MAC key, allowing for both authentication as well as confidentiality, simultaneously. To authenticate several items, a new key must be used for each item that Alice wishes to authenticate to the server.

If required, additional complexity can be added by using a subkey. For example, if TA is the time marker using the last valid block hash, then this can be incorporated to form a key hierarchy:

$$P_A \to P_{A(1)} = P_A + T_A G.$$

A pair of keys derived from $S_1$ ($S_2$, $S_3$) can then be taken as coefficients and define the function to be $$f(M, K) = S_2 M + S_3$$

$f$(M, K) can be made even stronger as $y=(S_2 M+S_3)$ mod N for some agreed and suitable integer N. If an attacker sees one (M, y) pair this is so held in determining y' for the next message M'.

Short MAC

A small amount of security can be sacrificed while still having a sufficiently secure MAC. In Bitcoin, the key length, taking only a single coordinate ($S_1$) is 256 bits. For low power devices, this can be reduced by using a lower-order value for the modulus allowing for the process to be performed in a reasonable time with modest computation power. If a small N, say 64 bits, is selected, $y \equiv S_2 M + S_3$ mod N is now limited to a 64 bit value. Alternatively, M can be divided into blocks with length smaller or equal to N, $M=M_1$, $M_2$, . . . , $M_r$, where $0 \leq M_i \leq N$. A corresponding number of unique keys can be derived using the protocols proposed above $k=(S_2, S_3, . . . , S_{r+1})$, where $0 \leq S_i \leq N$.

$$f(M,K) = \Sigma S_i M_i S_2 (\text{mod } N)$$

Finally, it is possible to have a less secure but very simple means of sending only the lower order bits of:

$$y = S_2 M + S_3 (\text{mod } N).$$

Streaming Hash-Based MAC (HMAC)

If an application requires additional security to that provided by the standard MAC, a hash-based MAC (HMAC) can be used. Unlike the MAC, the HMAC can be easily extended to large files (beyond the key size of a SHA256 hash as is the requirement for the arrangement disclosed in International patent application WO 2017/145016) through the stream or block encryption schemes proposed in Section 3 This can be done by dividing the file into 256-bit parts:

$B_0$, $B_1$, . . . , $B_n$

Where n=(file size)/256. $B_n$ is padded with zeros to assure uniformity of size between all $B_i$.

Protocol

Starting with a derived secret $S_1$ using the method disclosed in International patent application WO 2017/145016 and explained above, subsequent keys can be securely derived using various operations including modular addition (+), exclusive or ($\oplus$), hashing (h(x)), and concatenation (conc(a,b)). Five efficient alternatives to using a pseudorandom number generator (PRNG) are using:

1. $S_i = S_{i-1} + h(conc\,(i - 1, S_1, B_0))$
2. $S_i = S_{i-1} + conc\,(h(B_0), h(S_{i-1}))$
3. $S_i = S_{i-1} \oplus h(S_{i-1})$
4. $S_i = h(S_{i-1}) \oplus h(B_{i-1})$
5. $S_i = h(conc\,(S_{i-1}, B_{i-1}))$ Now with a method to derive subsequent keys, the value $S_i$ is XOR combined against $B_i$ to act as an OTP (onetime pad) to secure the steam or channel. Explicitly, the cypher block ($C_i$) can be calculated as:

$$C_i = S_i \oplus B_i$$

All derived keys can be calculated using $S_0$ and initial block hash (for the initial 256-bit) and ensure data integrity.

Use Case

Secure Peer-to-Peer Messaging Service

Peer-to-peer communication with end-to-end encryption is described in detail above, with extension to incorporate multimedia files and streaming data examined above. The ability to freely integrate these protocols on blockchain systems provides additional flexibility for application developers to provide tamper-proof security to its users. With the incorporation of a Message Authentication Code (MAC), additional certainty can be provided to a user that the message is originating from the identity claimed and there was no attempt to obscure or change the message. For transmitting very sensitive information, this is a crucial feature.

The present disclosure provides an efficient and secure cryptographic system using the XOR operation. The simplicity of the required computations allows for easy incorporation using even the blockchains with the most basic languages, such as bitcoin (BSV). These schemes allow for the proliferation of secure and versatile applications across many different systems and devices.

Figure 6:
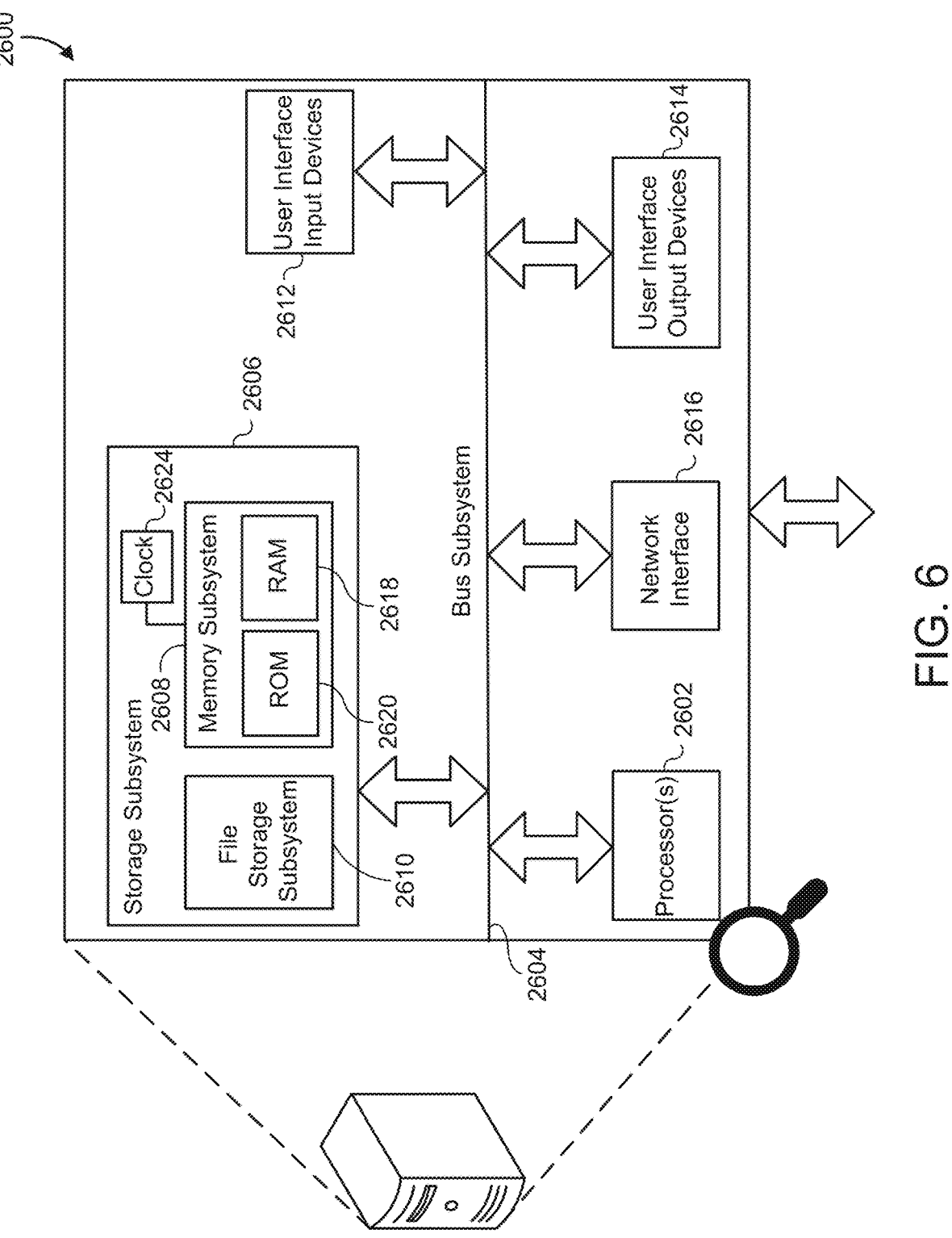
FIG. 6 is a schematic diagram illustrating a computing environment in which various embodiments can be implemented.

Turning now to FIG. 6, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 6, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 6 is intended only as a specific example for purposes of illustrating the preferred embodiment of the device. Many other configurations having more or fewer components than the system depicted in FIG. 6 are possible.

Enumerated Example Embodiments

Examples of the embodiments of the present disclosure can be described in view of the following clauses:

1. A method of encrypting data, the method comprising:

determining, by a first participant, an encryption key, based on a common secret common with said first participant and a second participant, for encryption of data;

encrypting said data on the basis of said encryption key to provide encrypted data, wherein the step of encrypting said data includes at least one exclusive or (XOR) operation; and incorporating said encrypted data into a blockchain transaction.

By providing an encryption process including at least one exclusive or (XOR) operation, this provides the advantage that by using a bit-by-bit XOR encoding of a binary message string with a secret key of the same length, an XOR cypher can be derived and freely shared on the public network. Subsequently, the cyphertext can be decrypted using the bit-by-bit XOR operation on the message and the same secret key. The simplicity of the protocol has the additional benefit that it can be incorporated into any cryptography-based system. The advantage is also provided that computational efficiency of the present invention enables the session key generation proposed in International patent application WO 2017/145016 to be used in low power devices (mobile device or smart cards) and included within scripts in Bitcoin. The advantage is also provided of minimising the risk of alteration of the data, or of making alteration of the data detectable.

2. A method according to clause 1, wherein the encrypted data is included in an output of the blockchain transaction.

This provides the advantage that the data in the output of the blockchain transaction has a verifiable digital signature so that the identity of the sender of the data can be checked by a recipient, and a check can be made that the data has not been altered since it was signed.

3. A method according to clause 1 or 2, wherein the encrypted data is included in publicly accessible data in the transaction.

This provides the advantage that access to the data for decryption can be obtained without the necessity of redeeming/spending the blockchain transaction.

4. A method according to any one of the preceding clauses, wherein a session key and/or password can be derived from the encrypted data by means of the common secret.

5. A method according to any one of the preceding clauses, wherein the blockchain transaction is redeemed by means of a script based on the common secret.

6. A method according to clause 5, wherein the transaction is redeemed by means of a script containing data based on application of a one way function to data based on the common secret.

This provides the advantage that the common secret is not exposed on redemption of the transaction, and can therefore be re-used.

7. A method according to clause 6, wherein the one way function is a hash function.

8. A method according to any one of the preceding clauses, wherein redemption of the transaction exposes the data.

9. A method according to any one of the preceding clauses, wherein redemption of the transaction causes the participant redeeming the transaction to be identified.

This provides the advantage of maintaining privacy until the transaction is redeemed, but enabling the spender of the transaction to be identified in the case of more than one public key.

10. A method according to any one of the preceding clauses, further comprising causing said data to be encrypted by means of an encryption key based on a second common secret common to said first participant and a third participant as a result of sending encrypted data to said second participant.

This provides the advantage of enabling multi-party encrypted communication with a record of the communications.

11. A method according to any one of the preceding clauses, further comprising causing data to be sent to the first participant as a result of data being sent from the second participant to a third participant.

12. A method according to any one of the preceding clauses, further comprising determining a plurality of said encryption keys by means of repeated application of a one way function to data based on said common secret.

This provides the advantage that the common secret need only be established once and is then used as a seed for generation of multiple keys without the necessity of further online data exchange.

13. A method according to clause 12, wherein the one way function is a hash function.

14. A method according to clause 12 or 13, wherein a first said encryption key used to encrypt first data is related to a second said encryption key used to encrypt second data subsequently to encryption of said first data by application of the one way function to data based on the first encryption key.

This provides the advantage of maintaining secrecy of the shared secret.

15. A method according to any one of the preceding clauses, wherein the encryption is carried out by applying at least one encryption key to portions of said data.

This provides the advantage of improving efficiency in the case of large sets of data.

16. A method according to any one of the preceding clauses, wherein at least one said encryption key is a matrix.

This provides the advantage of enabling more secure encryption because of the non-linear nature of matrix multiplication.

17. A method according to clause 16, wherein elements of the matrix are generated by repeated application of a one way function to data based on said common secret.

18. A method according to clause 16 or 17, wherein at least one said matrix is derived from the product of two matrices with linearly independent columns and rows.

This provides the advantage of providing an invertible matrix, thereby enabling calculation of a decryption key.

19. A method according to any one of the preceding clauses, wherein the encryption is carried out by repeated application of at least one said encryption key to at least one portion of said data.

This provides the advantage of providing further security because of the non-linear nature of such repeated encryption.

20. A method according to any one of the preceding clauses, further comprising determining, at said first participant, said common secret, wherein said first participant is associated with a first public-private key pair of a cryptography system having a first private key and a first public key, wherein the second participant is associated with a second public-private key pair of the cryptography system having a second private key and a second public key, wherein the common secret is determined at the first participant on the basis of the first private key and the second public key, and wherein the properties of the cryptography system are such that the common secret can be determined at the second participant on the basis of the second private key and the first public key.

21. A method according to clause 21, wherein the cryptography system is an elliptic curve cryptography system.

22. A method according to any one of the preceding clauses, wherein the first participant has a share of the common secret, and the common secret is accessible to a threshold number of said shares and is inaccessible to less than said threshold number of said shares.

23. A method for generating an encryption key for encrypting data, the method comprising: determining, by a first participant, an encryption key for encryption of data, wherein the encryption key is based on at least one exclusive or (XOR) combination of first data, based on a common secret common with said first participant and a second participant, with second data, based on application of a one way function to data based on the common secret.

This provides the advantage of computational efficiency, enabling the method to be used with devices of low processing power.

24. A method according to clause 23, further comprising determining a plurality of said encryption keys by means of repeated application of said one way function to data based on said common secret.

25. A method according to clause 23 or 24, wherein the one way function is a hash function.

26. A method according to any one of clauses 23 to 25, wherein a first said encryption key used to encrypt third data is related to a second said encryption key used to encrypt fourth data subsequently to encryption of said third data by application of the one way function to data based on the first encryption key.

27. A method according to any one of clauses 23 to 26, wherein the encryption is carried out by applying at least one encryption key to portions of said data.

28. A method according to any one of clauses 23 to 27, wherein at least one said encryption key is a matrix.

29. A method according to clause 28, wherein elements of the matrix are generated by repeated application of the one way function to data based on said common secret.

30. A method according to clause 28 or 29, wherein at least one said matrix is derived from the product of two matrices with linearly independent columns and rows.

31. A method according to any one of clauses 23 to 30, wherein the encryption is carried out by repeated application of at least one said encryption key to at least one portion of said data.

32. A method according to any one of clauses 23 to 31, further comprising determining, at said first participant, said common secret, wherein said first participant is associated with a first public-private key pair of a cryptography system having a first private key and a first public key, wherein the second participant is associated with a second public-private key pair of the cryptography system having a second private key and a second public key, wherein the common secret is determined at the first participant on the basis of the first private key and the second public key, and wherein the properties of the cryptography system are such that the common secret can be determined at the second participant on the basis of the second private key and the first public key.

33. A method according to clause 32, wherein the cryptography system is an elliptic curve cryptography system.

34. A method according to any one of clauses 23 to 33, wherein the first participant has a share of the common secret, and the common secret is accessible to a threshold number of said shares and is inaccessible to less than said threshold number of said shares.

35. A method of encrypting data, the method comprising:

generating an encryption key by means of a method according to any one of clauses 23 to 34; and encrypting data on the basis of said encryption key to provide encrypted data, wherein the step of encrypting said data includes at least one exclusive or (XOR) operation.

36. A method according to clause 35, further comprising incorporating said encrypted data into a blockchain transaction.

37. A method according to clause 36, wherein the encrypted data is included in an output of the blockchain transaction.

38. A method according to clause 36 or 37, wherein the encrypted data is included in publicly accessible data in the transaction.

39. A method according to any one of clauses 36 to 38, wherein a session key and/or password can be derived from the encrypted data by means of the common secret.

40. A method according to any one of clauses 36 to 39, wherein the blockchain transaction is redeemed by means of a script based on the common secret.

41. A method according to clause 40, wherein the transaction is redeemed by means of a script containing data based on application of a one way function to data based on the common secret.

42. A method according to clause 41, wherein the one way function is a hash function.

43. A method according to any one of clauses 36 to 42, wherein redemption of the transaction exposes the data.

44. A method according to any one of clauses 36 to 43, wherein redemption of the transaction causes the participant redeeming the transaction to be identified.

45. A method of applying authentication data to a message, the method comprising:

determining, by a first participant, message authentication data for a message to be communicated to a second participant, wherein the message authentication data is determined by applying a function, known to said first participant and said second participant, to said message and to a common secret common to said first participant and said second participant.

This provides the advantage of enabling the message authentication data to be recalculated at the second node in order to check that the data has not been corrupted since the message authentication data was originally determined.

46. A method according to clause 45, wherein the message is included in a blockchain transaction.

47. A method according to clause 46, wherein the message includes data relating to previous blockchain transactions.

This provides the advantage of enabling a check to be made off-line that transaction data has not changed in transmission. This is particularly useful in the case of low power devices.

48. A method according to clause 46 or 47, wherein the message authentication data is included in the blockchain transaction.

49. A method according to any one of clauses 46 to 48, further comprising the step of communicating at least said message authentication data to said second participant separately from said blockchain transaction.

50. A method according to any one of clauses 45 to 49, wherein the message authentication data includes a plurality of data items based on said common secret.

51. A method according to clause 50, wherein a plurality of said data items are applied to respective parts of said message.

This provides the advantage of more efficient processing of message data in the case of large data items.

52. A method according to any one of clauses 45 to 51, wherein the function includes at least one exclusive or (XOR) operation.

53. A method according to any one of clauses 45 to 52, wherein the message authentication data includes a plurality of data items determined by repeated application of a one way function to data based on said common secret.

54. A method according to clause 53, wherein the one way function is a hash function.

55. A method according to clause 53 or 54, wherein a first said data item applied to a first message is related to a second said data item applied to a second message subsequently to application of said first data item to said first message by application of the one way function to data based on the common secret.

56. A method according to any one of clauses 45 to 55, further comprising determining, at said first participant, said common secret, wherein said first participant is associated with a first public-private key pair of a cryptography system having a first private key and a first public key, wherein the second participant is associated with a second public-private key pair of the cryptography system having a second private key and a second public key, wherein the common secret is determined at the first participant on the basis of the first private key and the second public key, and wherein the properties of the cryptography system are such that the common secret can be determined at the second participant on the basis of the second private key and the first public key.

57. A method according to clause 56, wherein the cryptography system is an elliptic curve cryptography system.

58. A method according to any one of clauses 45 to 57, wherein the first participant has a share of the common secret, and the common secret is accessible to a threshold number of said shares and is inaccessible to less than said threshold number of said shares.

59. A computer-implemented system comprising:
a processor; and
memory including executable instructions that, as a result of execution by the processor, causes the system to perform any embodiment of the computer-implemented method as claimed in any of clauses 1 to 58.

60. A non-transitory computer-readable storage medium having stored thereon executable instructions that, as a result of being executed by a processor of a computer system, cause the computer system to at least perform an embodiment of the method as claimed in any of clauses 1 to 58.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

| | References |
|---|---|
| Reference | Author, date, name & location |
| 1 | Merkle, Ralph C. (April 1978). "Secure Communications Over Insecure Channels". Communications of the ACM. 21 (4): 294-299. |
| 2 | Diffie, Whitfield; Hellman, Martin E. (November 1976). "New Directions in Cryptography" IEEE Transactions on Information Theory. 22 (6): 644-654. |
| 3 | Menezes, A.; van Oorschot, P.; Vanstone, S. (1996). "Handbook of Applied Cryptography". CRC Press. p. 500. |
| 4 | International patent application WO 2017/145016 |
| 5 | Belding, J.; Georges, S.; Barr, S.; Uddeen, F.; Lee, B. (2018) "Tokenized: A token Protocol for the Bitcoin (BSV) Network. |
| 6 | Sastry, V. U. K.; Anup Kumar, K. (2012) "A Modified Feistel Cypher Involving XOR Operation and Modular Arithmetic Inverse of a Key Matrix". International Journal of Advanced Computer Science and Applications (IJACSA). 3(7): 35-39. |
| 7 | William H, Brian P, Flannery P, Saul A, et al. Numerical recipes in C: The Art of Scientific Computing (1992) Cambridge. |

The invention claimed is:

1. A method of encrypting data, the method comprising:
determining, by a first participant, an encryption key, based on a common secret common with said first participant and a second participant, for encryption of data;
encrypting said data on the basis of said encryption key to provide encrypted data, wherein the step of encrypting said data includes at least one exclusive or (XOR) operation; and
incorporating said encrypted data into a blockchain transaction, wherein the encrypted data is inserted as a spendable output of the blockchain transaction.

2. The method according to claim 1, wherein the encrypted data is included in publicly accessible data in the transaction.

3. The method according to claim 1, wherein a session key and/or password can be delived from the encrypted data by means of the common secret.

4. The method according to claim 1, wherein the blockchain transaction is redeemed by means of a script based on the common secret.

5. The method according to claim 4, wherein the transaction is redeemed by means of a script containing data based on application of a one way function to data based on the common secret.

6. The method according to claim 5, wherein the one way function is a hash function.

7. The method according to claim 1, wherein redemption of the transaction exposes the data.

8. The method according to claim 1, wherein redemption of the transaction causes the participant redeeming the transaction to be identified.

9. The method according to claim 1, further comprising causing said data to be encrypted by means of an encryption key based on a second common secret common to said first participant and a third participant as a result of sending encrypted data to said second participant.

10. The method according to claim 1, further comprising: causing data to be sent to the first participant as a result of data being sent from the second participant to a third participant.

11. The method according to claim 1, further comprising: determining a plurality of said encryption keys by means of repeated application of a one way function to data based on said common secret.

12. The method according to claim 11, wherein the one way function is a hash function.

13. The method according to claim 11, wherein a first said encryption key used to encrypt first data is related to a second said encryption key used to encrypt second data subsequently to encryption of said first data by application of the one way function to data based on the first encryption key.

14. The method according to claim 1, wherein the encryption is carried out by applying at least one encryption key to portions of said data.

15. The method according to claim 1, wherein at least one said encryption key is a matrix.

16. The method according to claim 15, wherein elements of the matrix are generated by repeated application of a one way function to data based on said common secret.

17. The method according to claim 15, wherein at least one said matrix is derived from the product of two matrices with linearly independent columns and rows.

18. The method according to claim 1, wherein the encryption is carried out by repeated application of at least one said encryption key to at least one portion of said data.

19. The method according to claim 1, further comprising:

determining, at said first participant, said common secret, wherein said first participant is associated with a first public-private key pair of a cryptography system having a first private key and a first public key, wherein the second participant is associated with a second public-private key pair of the cryptography system having a second private key and a second public key, wherein the common secret is determined at the first participant on the basis of the first private key and the second public key, and wherein properties of the cryptography system are such that the common secret can be determined at the second participant on the basis of the second private key and the first public key.

\* \* \* \* \*